United States Patent [19]
Ball et al.

[11] Patent Number: 5,534,694
[45] Date of Patent: Jul. 9, 1996

[54] INFRARED IMAGING SYSTEM FOR ENHANCING THE PERCEPTION OF A SCENE BY A VEHICLE OPERATOR

[75] Inventors: Gary E. Ball, Palos Verdes Estates; Edward D. Eby, Torrance, both of Calif.

[73] Assignee: Hughes Electronics, Los Angeles, Calif.

[21] Appl. No.: 300,895

[22] Filed: Sep. 6, 1994

Related U.S. Application Data

[63] Continuation of Ser. No. 894,143, Jun. 4, 1992, abandoned.

[51] Int. Cl.⁶ ........................................................... G01J 5/00
[52] U.S. Cl. ......................................... 250/330; 250/339.14
[58] Field of Search ..................................... 250/330, 334, 250/339, 226, 339.14; 340/945, 953, 705; 358/113, 103; 348/342; 359/614, 634

[56] References Cited

U.S. PATENT DOCUMENTS

| | | | |
|---|---|---|---|
| 3,610,930 | 10/1971 | Lacy | 250/332 |
| 3,671,963 | 6/1972 | Assouline et al. | 250/320 |
| 3,885,095 | 5/1975 | Wolfson et al. | 358/103 |
| 4,063,093 | 12/1977 | Roberts | 250/343 |
| 4,064,535 | 12/1977 | Cross et al. | 348/164 |
| 4,207,688 | 6/1980 | Derderian et al. | 358/104 |
| 4,325,083 | 4/1982 | Rouchon et al. | 348/362 |
| 4,352,105 | 9/1982 | Harney | 340/703 |
| 4,697,879 | 10/1987 | Gerbe | 340/705 |
| 4,866,275 | 9/1989 | Jaeger et al. | 250/330 |
| 4,868,567 | 9/1989 | Eichweber | 358/103 |
| 5,149,959 | 9/1992 | Collins et al. | 250/334 |

FOREIGN PATENT DOCUMENTS 52-14417  3/1977  Japan ..................................... 359/634

*Primary Examiner*—Constantine Hannaher
*Attorney, Agent, or Firm*—Michael W. Sales; Wanda K. Denson-Low

[57] ABSTRACT

A thermal or infrared imaging system that is particularly useful to enhance a vehicle operator's perception of surrounding scene features under vision-impaired conditions, e.g., rain, fog, smoke, and the like. Scene radiation is passed to an imaging sensor through a wavelength-selective attenuator that operates to pass radiation in a first wavelength range substantially without attenuation and to pass radiation in a second wavelength range with controllable attenuation. This permits maximum sensitivity to objects in the scene that radiate in the fist wavelength range and controllable sensitivity to objects that radiate in the second wavelength range, whereby the sensor may be prevented from becoming overloaded or saturated by radiation in the second wavelength range while continuing to produce useable image signals of objects in the scene that radiate in the first wavelength range.

17 Claims, 1 Drawing Sheet

5,534,694

INFRARED IMAGING SYSTEM FOR ENHANCING THE PERCEPTION OF A SCENE BY A VEHICLE OPERATOR

This is a continuation of application Ser. No. 07/894,143 filed Jun. 4, 1992, now abandoned.

BACKGROUND

This invention relates to forward looking infrared imaging systems, and particularly to such systems as may be used to enhance a vehicle operator's perception of surrounding scene features under vision-impaired conditions, e.g., rain, fog, smoke, and the like. This invention is applicable to any vehicle that is operated in vision-impaired conditions, such as trains, highway vehicles, ships, and aircraft. It is particularly applicable as an aircraft landing aid.

There is currently a commercially available aircraft landing aid that projects a synthetic representation of the runway boundaries on a pilot's head up display (HUD). This system is used to permit the pilot to bring the aircraft close enough to landing that the pilot can see the runway with the unaided eye. This system uses inertial references to sense the aircraft's location and predict where the runway should be. The system is very expensive.

Another concept has been demonstrated using millimeter wave radar to detect an airport runway and present its image on a HUD. This system's performance is marginal because of poor resolution and ambiguous detection. The millimeter wave radar can only detect the contrast between concrete and soil. The pilot cannot readily discern what part of the runway he is seeing; only that there is a strip of concrete with adjacent earth.

SUMMARY OF THE INVENTION

The imaging system of the present invention employs a thermal or infrared imager that provides a vehicle operator with a TV-like display of the scene ahead of the vehicle for safe operation of the vehicle. This systems "sees" through smoke, dust, haze and fog in conditions when the unaided eye would not provide adequate perception for safe operation.

A dual spectral band of operation and adaptability of spectral sensitivity are utilized. These features provide maximum recognition range from:

Visibility on both sides of a fog's resonant mode (an opaque spectral band unique to every fog and variable in the fog's life)

Spectral sensitivity initially maximized at the infrared wavelength of navagation lights, such as railroad signal lights, marine navigation lights, and airport approach and runway lights Adaptation of spectral sensitivity to accommodate the large signal from nearby navigation lights while maintaining high sensitivity to the longer wavelength signature of unheated objects An object of the present invention is to provide vehicle operators with useful visibility in poor atmospheric weather conditions. Authority to operate a ship in a harbor, a train in a transportation yard, or an aircraft in or near an airport is restricted by visibility. The present invention provides a cost effective solution to the poor visibility problem.

With specific reference to aircraft, currently only very expensive landing aids are available. These systems either land the plane for the pilot using radio frequency devices, or provide a synthetic representation of the runway on a CRT display based upon information from inertial sensor data. The present invention will present a visible image representative of the infrared image of the scene ahead of the aircraft on a CRT head up display (HUD) superimposed on the pilot's view of the real scene. In the case where fog obscures vision, only the HUD image of the scene will be visible. As the aircraft gets closer to the runway, normal visibility will resume thorough the HUD.

The invention is an improved infrared imaging system for enhancing the perception of a scene by a vehicle operator through vision-impaired conditions, such as the presence of rain, fog, smoke and the like, comprising an infrared imaging sensor, an optical system for receiving infrared radiation from a scene and forming an infrared image of the scene on said sensor, a readout coupled to said sensor for outputting electrical signals representative of the infrared image of the scene on said sensor, a display for receiving the electrical signals from said readout and producing a visible image viewable by said operator, said visible image being representative of the infrared image of the scene on said sensor, and a wavelength-selective attenuator between said scene and said sensor for attenuating a selected wavelength range of the infrared radiation received from the scene.

The optical system spectrally bandpass limits the radiation directed to the sensor to 1–5μ (micron). The wavelength selective attenuator may comprise a wavelength selective beam splitter for splitting the radiation received from the scene into a first beam and a second beam whereby infrared radiation in said selected wavelength range received from the scene is directed along said first beam and the remainder of the infrared radiation received from the scene is directed along said second beam, a variable attenuator located in said first beam, and a beam combiner for combining said first beam and said second beam into a composite beam and directing said composite beam to said sensor. The invention also contemplates an attenuator control connected to said sensor and to said attenuator for controlling the attenuation of said attenuator in response to the intensity of infrared radiation in the infrared image of the scene on said sensor.

DESCRIPTION OF THE PREFERRED EMBODIMENT

Figure 1:
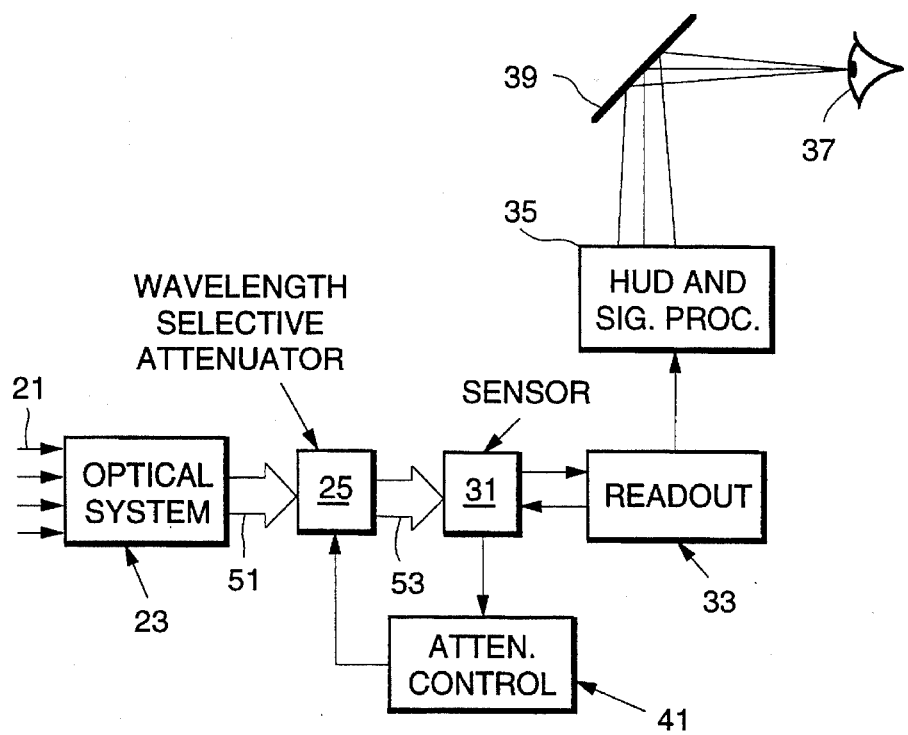
FIG. 1 is an overall block diagram of the sensor system of the current invention.

Fog is composed of spherical water droplets with similar radii. When fogs are forming, the initial radii are sub-micron dimension. The radii grow as the fog matures. As the fog dissipates, the radii shrink. At any instant, there is a common radius for most droplets. The wavelength equal to the droplet radius is called "resonant mode." The spectral transmissivity in fogs is very low at the wavelength of the resonant mode. The transmissivity is slightly better at wavelengths slightly shorter than the resonant mode and much better at wavelengths slightly longer than the resonant mode. There is a clear advantage to having visibility on both sides of the resonant mode. As the concentration of the droplets (measured in droplets per cubic centimeter) increases, the attenuation of transmissivity increases.

The present invention provides a vehicle operator visible recognition of the scene when fog limits his visibility. It uses an infrared imaging sensor that "sees" temperature contrast between objects. Reduction in infrared transmissivity of the atmosphere between the sensor and the scene limits the recognition range. Adjacent objects with higher temperature contrast can be seen at longer ranges, even when the transmissivity is reduced. In an airport environment, for example, the objects with highest temperature contrast from adjacent unheated objects are the runway approach lights. These lights are arranged in uniform recognizable patterns known to pilots from airport flight manuals. The lights give maximum signature (brightness) at approximately the 1μ (micron) wavelength.

The present invention uses variable attenuation in a selected wavelength range to maximize the recognition range of navagation lights in thick fogs and other vision impairing conditions, then to attenuate the radiation therefrom at shorter ranges to prevent overload or blinding of the sensor. When the fog is very thick (in terms of the quantity of droplets along the line of sight), the sensor is allowed its maximum sensitivity over the full 1–5μ spectral interval. This increases the recognition range by providing visibility on both sides of the resonant mode if that mode is between 1 and 5μ. As the aircraft gets closer to the approach lights, they become intense to the point of blinding the sensor. An attenuation control responds to the increasing sensor output signal and introduces increased attenuation in the 1–3μ wavelength range (where most of the approach light signature exists) effectively reducing the sensitivity of the sensor to the lights. The 3–5μ wavelength sensitivity remains unattenuated in order to allow recognition of lower temperature contrast objects such as the runway, buildings, other aircraft, land vehicles, and the like.

The optical system and imaging sensor are mounted in the aircraft or other vehicle such that the scene ahead of the operator is viewed. The sensor is boresighted to the HUD such that the visible image of the scene presented on the HUD overlays the real scene viewed by the operator through the HUD combiner glass.

FIG. 1 shows that the infrared scene radiation 21 is collected by an optical system 23 and directed through a wavelength selective attenuator 25 to an infrared imaging sensor 31. Optical system 23 may comprise any of a number of known telescopes, for example, as shown in U.S. Pat. Nos. 4,733,955 and 4,265,510. Also, optical system 23 may spectrally bandpass limit the radiation directed to the sensor 31 to 1–5μ. This may be accomplished by means of wavelength selective coatings on elements within optical system 23. A readout 33 coupled to sensor 31 outputs electrical signals representative of the infrared image of the scene on sensor 31. HUD signal processor 35 receives the electrical signals from readout 33 and projects a visible image viewable by the operator, represented by the "eye" symbol 37. The visible image is representative of the infrared image of the scene on sensor 31 and is reflected to the operator by a combiner plate 39 that effectively superimposes the visible image produced by HUD 35 on the operator's direct vision view of the scene.

The wavelength-selective attenuator 25 between the scene and sensor 31 attenuates a selected wavelength range of the infrared radiation received from the scene. The selected wavelength range is 1–3μ, which contains the radiation from hot or high energy infrared sources, such as tungsten filament electric lamps, within the scene. The wavelength-selective attenuator 25 permits radiation from such hot or high energy infrared sources within the scene at long distances to be passed to the sensor 31 without attenuation, but as the vehicle approaches such high infrared energy sources, to be variably attenuated to prevent such energy from saturating or "blinding" the imaging sensor 31. Attenuation control is effected by means of an attenuator control 41 connected to sensor 31 and to wavelength-selective attenuator 25. Attenuator control 41 monitors the output level of sensor 31 and in response to increasing output level from sensor 31 causes wavelength-sensitive attenuator 25 to increase the attenuation of the selected wavelength range. In this manner, sensor 31 will respond to such sources as electric lamps at great distances and yet not be blinded by such sources when the vehicle approaches them.

The 3–5μ wavelength portion of the radiation from the scene is not selectively attenuated. This is because the cooler infrared sources of radiation within the scene, e.g. the ground, trees, airport runways, other vehicles, buildings, etc., radiate infrared energy within the 3–5μ range. Thus, these sources of infrared energy are imaged at maximum sensitivity at all times.

Figure 2:
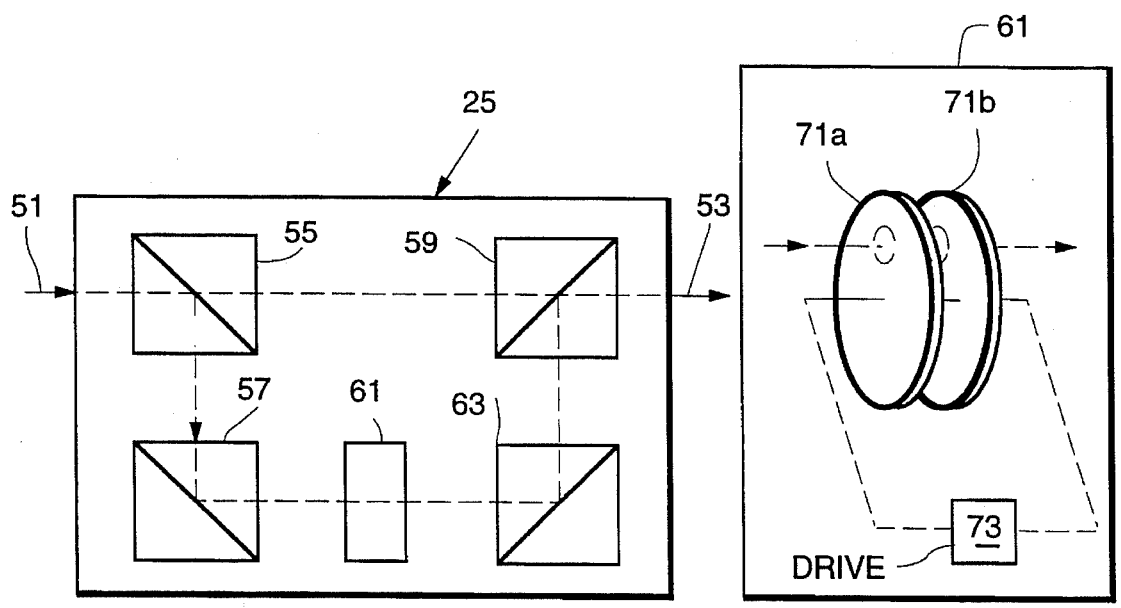
FIG. 2 is a more detailed block diagram showing the dual wavelength band arrangement for selectively attenuating one wavelength band.

FIG. 2 shows an embodiment of wavelength-selective attenuator 25 with radiation 51 from optical system 23 entering on the left and exiting as radiation 53 at the right where it is directed to sensor 31. Within this embodiment of wavelength-selective attenuator 25, radiation 51 first encounters dichroic (beam splitting) cube 55 which reflects 1–3μ wavelength radiation in a first beam to a reflecting cube 57 and transmits 3–5μ radiation in a second beam to beam combining cube 59.

Reflecting cube 57 reflects the first beam of 1–3μ radiation through a controllable attenuator 61 to a second reflecting cube 63, that reflects the first beam to combining cube 59. Combining cube combines the first beam of 1–3μ radiation with the second beam of 3–5μ radiation into beam 53 which is directed to sensor 31.

Figure 3:
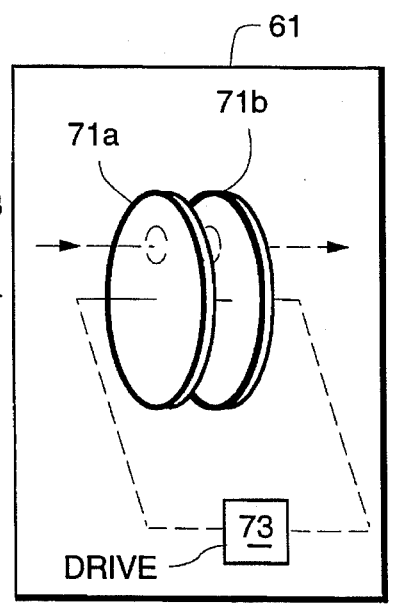
FIG. 3 illustrates diagrammatically a controllable attenuator that may be used in the wavelength-selective attenuator of FIG. 2.

FIG. 3 illustrates diagrammatically one embodiment of controllable attenuator 61 which may comprise two wheels 71a, 71b of polarizing material through which the first beam passes. Wheels 71a and 71b are rotated by driver 73 which responds to signals from attenuator control 41. Wheels 71a and 71b may be rotated from a position wherein their polarization axes are aligned, whereat minimum attenuation will occur, to a position wherein their polarization axes are orthogonal, whereat maximum attenuation will occur. Intermediate values of attenuation will occur at intermediate positions.

It will be recognized by persons skilled in the art that both wheels 71a, 71b need not be rotated. It is necessary only to have relative rotation between the two polarizing elements. Thus, controlled attenuation may be achieved with a single polarizing wheel 71a and a fixed polarizing element in the place of wheel 71b.

In an alternative embodiment, controllable attenuator 61 may comprise a single wheel 71a in the form of a neutral density filter whose density varies with angular position, from a position where attenuation is minimal to a position where attenuation is maximum. In yet another embodiment, the attenuator 61 may comprise a variable transmissivity neutral density filter wheel pair.

The invention of the present invention provides an infrared imaging system for enhancing the perception of a scene by a vehicle operator through vision-impaired conditions. It provides long-distance imaging of hot or high energy infrared sources (e.g. electric lamps) within the scene at maximum sensitivity (minimum attenuation) in the 1–3μ wavelength range and automatically reduces the sensitivity (introduces attenuation) to radiation from such sources as the vehicle approaches them in order to prevent the sensor from being overloaded or blinded, which would deteriorate the images of cooler objects in the scene as well as the hotter objects. Radiation from most objects in a scene, e.g. earth, concrete pavement or runways, railroad tracks, other vehicles, and the like, do not radiate significantly in the 1–3μ wavelength range, but do radiate significantly at longer wavelengths. Radiation at these longer wavelengths is passed to the sensor with little or no attenuation, thus maintaining maximum sensitivity of the sensor thereto independently of any attenuation of radiation in the 1–3μ wavelength range.

Modifications and variations to the present invention may be implemented without departing from its scope. For example, with a suitable sensor 31, it may not be desirable to spectrally bandpass limit the radiation directed to the sensor to the 1–5μ wavelength range. It is well known that cooler objects radiate in the medium to long infrared wavelength range, e.g. up to 12μ. With a suitable sensor 31, such wavelengths may be utilized.

What is claimed is:

1. An aircraft infrared imaging landing aid system for enhancing the perception of a scene by an operator comprising:

an infrared imaging sensor;

an optical system for receiving infrared radiation from a scene and forming an infrared image of the scene on said sensor;

a readout coupled to said sensor for outputting electrical signals representative of the infrared image of the scene on said sensor;

a display for receiving the electrical signals from said readout and producing a visible image viewable by said operator, said visible image being representative of the infrared image of the scene on said sensor; and a wavelength-selective attenuator between the scene and said sensor for controllably attenuating a selected wavelength range of the infrared radiation received from the scene.

2. The infrared imaging system according to claim 1, further comprising an attenuator control, responsive to said sensor and operative on said attenuator, for controlling the attenuation by said attenuator in response to the intensity of the infrared radiation from the scene on said sensor.

3. The infrared imaging system according to claim 1, wherein the optical system includes bandpass means for passing to said attenuator only the infrared radiation having wavelengths between 1 μm and 5 μm, and wherein the selected wavelength range is between 1 μm and 3 μm.

4. The infrared imaging system according to claim 1, wherein the wavelength-selective attenuator comprises:

a wavelength selective beam splitter for splitting the infrared radiation from the scene into a first beam and a second beam, wherein the infrared radiation in said selected wavelength range is directed along said first beam and the remainder of the infrared radiation is directed along said second beam;

a controllable attenuator located in said first beam; and a beam combiner for combining said first beam and said second beam into a combined beam and directing said combined beam towards said sensor.

5. The infrared imaging system according to claim 4, wherein the controllable attenuator comprises a variable transmissivity neutral density filter wheel pair.

6. The infrared imaging system according to claim 4, wherein the controllable attenuator comprises a pair of rotatable polarized wheels.

7. The infrared imaging system according to claim 4, wherein the beam splitter comprises a dichroic cube that reflects the infrared radiation in said selected wavelength range and transmits the remainder of the infrared radiation.

8. An aircraft infrared landing aid system for imaging infrared radiation having wavelengths within a selected wavelength range, comprising:

an infrared sensor;

a display, responsive to said sensor, for producing a visible image viewable by an aircraft operator; and means, disposed between said focusing means and said sensor, for controllably attenuating said infrared radiation having wavelengths within a subrange of said selected wavelength range.

9. The system according to claim 8, said system further including bandpass means for allowing only infrared radiation having wavelengths between 1 μm and 5 μm to be focused onto said sensor, and wherein said attenuating means controllably attenuates said infrared radiation having wavelengths between 1 μm and 3 μm.

10. The system according to claim 8, wherein the attenuating means comprises:

a dichroic cube for splitting the infrared radiation from said focusing means into a first beam and a second beam, wherein the infrared radiation having wavelengths within said subrange is directed along said first beam and the remainder of the infrared radiation is directed along said second beam;

a controllable attenuator for attenuating said first beam; and a beam combiner for combining said attenuated first beam and said second beam into a combined beam, said combined beam being directed towards said sensor.

11. The system according to claim 10, further comprising an attenuator control, responsive to said sensor and operative on said controllable attenuator, for controlling the attenuation of said first beam in response to the intensity of said infrared radiation sensed by said sensor.

12. An imaging system for enhancing the perception of a scene by a vehicle operator, comprising:

means for imaging electromagnetic radiation having wavelengths within a wavelength band;

means for focusing the electromagnetic radiation from said scene onto said imaging means; and means, disposed in front of said imaging means, for controllably varying the intensity of said electromagnetic radiation having wavelengths within a subband of said wavelength band, said varying means including means for splitting said electromagnetic radiation from said focusing means into first and second beams, said first beam consisting of said electromagnetic radiation having wavelengths within said subband, said second beam including at least some of the remainder of said electromagnetic radiation; a controllable attenuator for controlling the intensity of said first beam; and combining means for combining an output of said attenuator with said second beam to provide a combined beam, said combined beam being directed towards said imaging means.

13. The iamging system according to claim 12, wherein the focusing means focuses only electromagnetic radiation having wavelengths between 1 μm and 5 μm onto said sensor, whereby said wavelength band is between 1 μm and 5 μm, and wherein said varying means controllably varies the intensity of said electromagnetic radiation having wavelengths between 1 μm and 3 μm, whereby said subband is between 1 μm and 3 μm.

14. The imaging system according to claim 12, wherein said controllable attenuator includes a variable transmissivity neutral density filter wheel pair.

15. The imaging system according to claim 12, wherein said controllable attenuator includes a pair of rotatable polarized wheels.

16. The imaging system according to claim 12, wherein the splitting means includes a dichroic cube that reflects said electromagnetic radiation having wavelengths within said subband and transmits said remainder of electromagnetic radiation, whereby said first beam is formed from said reflected radiation and said second beam is formed from said transmitted radiation.

17. The imaging system according to claim 12, further comprising an attenuator control, responsive to said imaging means and operative on said controllable attenuator, for controlling the attenuation by said attenuator in response to the intensity of said electromagnetic radiation imaged by said imaging means.

\* \* \* \* \*